US010146926B2

(12) United States Patent
Jones

(10) Patent No.: US 10,146,926 B2
(45) Date of Patent: Dec. 4, 2018

(54) DIFFERENTIATED AUTHENTICATION FOR COMPARTMENTALIZED COMPUTING RESOURCES

(75) Inventor: Thomas C. Jones, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1120 days.

(21) Appl. No.: 12/176,009

(22) Filed: Jul. 18, 2008

(65) Prior Publication Data

US 2010/0017845 A1 Jan. 21, 2010

(51) Int. Cl.
G06F 21/33 (2013.01)
G06F 21/32 (2013.01)
G06F 21/34 (2013.01)

(52) U.S. Cl.
CPC .............. *G06F 21/33* (2013.01); *G06F 21/32* (2013.01); *G06F 21/34* (2013.01)

(58) Field of Classification Search
CPC ................................ H04L 63/08; G06F 21/33
USPC .............................................................. 726/1
See application file for complete search history.

(56) References Cited

U.S. PATENT DOCUMENTS

| 4,868,877 | A | 9/1989 | Fischer |
| 5,455,953 | A | 10/1995 | Russell |
| 6,026,166 | A | 2/2000 | LeBourgeois |
| 6,275,944 | B1 | 8/2001 | Kao et al. |
| 6,334,121 | B1 | 12/2001 | Primeaux et al. |
| 6,367,013 | B1 | 4/2002 | Bisbee et al. |
| 6,401,206 | B1 | 6/2002 | Khan et al. |
| 6,629,246 | B1 | 9/2003 | Gadi |

(Continued)

FOREIGN PATENT DOCUMENTS

KR 20070061606 A 6/2007

OTHER PUBLICATIONS

Sunrachet Tanwongsval, "Sun Ray Thin-Client and Smart Cards: An Old Concept With New Muscle," SANS institute 2002, pp. 1-13.*

(Continued)

*Primary Examiner* — Luu T Pham
*Assistant Examiner* — Canh Le
(74) *Attorney, Agent, or Firm* — Arent Fox LLP

(57) ABSTRACT

Embodiments for providing differentiated authentication for accessing groups of compartmentalized computing resources, and accessing each compartmentalized computing resources, as displayed on a desktop environment of an operating system. In one embodiment, a method includes organizing one or more computing resources accessible in a desktop environment into a group. The one or more computing resources include a data content, an application, a network portal, and a device. The method also includes providing an authentication policy for actions that can be performed on each computing resource. The authentication policy is configured to associate an authentication input to each action for a particular computing resource. The method further includes receiving an authentication input when the user intends one of the actions on the particular computing resource. The method additionally includes allowing the user to perform the intended action on the particular computing resource when the received authentication input enables the intended action.

20 Claims, 14 Drawing Sheets

(56) References Cited

U.S. PATENT DOCUMENTS

| | | | |
|---|---|---|---|
| 6,636,975 | B1 | 10/2003 | Khidekel et al. |
| 6,892,307 | B1 | 5/2005 | Wood et al. |
| 7,076,797 | B2 | 7/2006 | Loveland |
| 7,131,009 | B2 | 10/2006 | Scheidt et al. |
| 7,150,038 | B1 | 12/2006 | Samar |
| 7,152,066 | B2* | 12/2006 | Nelson et al. |
| 7,231,661 | B1 | 6/2007 | Villavicencio et al. |
| 7,845,003 | B2 | 11/2010 | Morris et al. |
| 7,949,771 | B1 | 5/2011 | Chen et al. |
| 2002/0138640 | A1* | 9/2002 | Raz et al. ............ 709/231 |
| 2003/0101348 | A1 | 5/2003 | Russo et al. |
| 2003/0125057 | A1* | 7/2003 | Pesola ............ G06F 17/30174 455/502 |
| 2004/0039909 | A1 | 2/2004 | Cheng |
| 2004/0088543 | A1 | 5/2004 | Garg et al. |
| 2004/0117662 | A1 | 6/2004 | Ong |
| 2004/0177272 | A1 | 9/2004 | Walters |
| 2005/0066164 | A1 | 3/2005 | Simon |
| 2005/0108551 | A1 | 5/2005 | Toomey |
| 2005/0120213 | A1 | 6/2005 | Winget et al. |
| 2005/0125736 | A1* | 6/2005 | Ferri ............ G06F 3/0481 715/747 |
| 2005/0132054 | A1* | 6/2005 | Chang et al. ............ 709/227 |
| 2005/0132220 | A1* | 6/2005 | Chang et al. ............ 713/201 |
| 2005/0228886 | A1 | 10/2005 | Cain et al. |
| 2005/0261926 | A1 | 11/2005 | Hartridge |
| 2005/0278547 | A1 | 12/2005 | Hyndman et al. |
| 2006/0020813 | A1 | 1/2006 | Birk et al. |
| 2006/0095763 | A1 | 5/2006 | Iyengar et al. |
| 2006/0282900 | A1* | 12/2006 | Johnson et al. ............ 726/26 |
| 2007/0006299 | A1 | 1/2007 | Elbury et al. |
| 2007/0016782 | A1 | 1/2007 | Orall et al. |
| 2007/0055887 | A1 | 3/2007 | Cross et al. |
| 2007/0136603 | A1 | 6/2007 | Kuecuekyan |
| 2007/0156732 | A1* | 7/2007 | Surendran ............ G06Q 10/107 |
| 2007/0192840 | A1* | 8/2007 | Pesonen ............ 726/5 |
| 2008/0034219 | A1* | 2/2008 | Ting ............ 713/186 |
| 2008/0059804 | A1* | 3/2008 | Shah et al. ............ 713/186 |
| 2008/0066150 | A1* | 3/2008 | Lim ............ G06F 17/3089 726/1 |
| 2008/0072311 | A1 | 3/2008 | Mullick et al. |
| 2008/0086731 | A1* | 4/2008 | Trossman et al. ............ 718/100 |
| 2008/0155682 | A1* | 6/2008 | Vykunta ............ 726/21 |
| 2008/0201382 | A1* | 8/2008 | Zagorski ............ 707/200 |
| 2008/0222719 | A1* | 9/2008 | Chang et al. ............ 726/17 |
| 2008/0244071 | A1* | 10/2008 | Parupudi ............ G06Q 10/06 709/226 |
| 2009/0178129 | A1* | 7/2009 | Cross et al. ............ 726/10 |
| 2009/0178132 | A1* | 7/2009 | Hudis ............ G06F 17/30867 726/12 |
| 2009/0248869 | A1* | 10/2009 | Ghostine ............ H04W 8/30 709/225 |

OTHER PUBLICATIONS

Faraz Fatemi Moghaddam et al., "Federated Policy Management Engine for Reliable Cloud Computing," IEEE, 2017, pp. 910-915.*

"CA Certificate Policy for Cybertrust Certification Services", found at <<http://cybertrust.omniroot.com/repository/Cybertrust%20CP%20v.2.3_cl.pdf>>, Sep. 11, 2007, 50 pgs.

Chokhani, "Internet X.509 Public Key Infrastructure Certificate Policy and Certification Practices Framework", found at <<http://www.ietf.org/rfc/rfc2527.txt>>, The Internet Society, Mar. 1999, 43 pgs.

"PKI Model Certificate Policy", found at <<http://www.ec3.org/Downloads/2001/PKI_Model_ED.pdf>>, NECCC E-Sign Interoperability Work Group, Dec. 2001, 49 pgs.

Dubin, "Traditional Single Sign-On (SSO) Products vs Federated Identities", retrieved on Apr. 23, 2008 at <<http://searchsecurity.techtarget.com/expert/KnowledgebaseAnswer/0,289625,sid14_gci1279100,00.html>>, SearchSecurity.com, Sep. 2, 2007, pp. 1-3.

Jonsson, "A Single Passport: The Power, Promise-and Perils-of Federated Identity", retrieved on Apr. 23, 2008 at <<http://www.rsa.com/newsletter/Vantage/Spring2004/single_passport.html>>, RSA Vantage Magazine, vol. 1, No. 2, 2004, pp. 1-5.

Patterson, et al., "Federated Identity: Single Sign-On Among Enterprises", retrieved on Apr. 23, 2008 at <<http://developers.sun.com/identity/reference/techart/federated.html>>, Sun Microsystems, Oct. 14, 2004, pp. 1-9.

Stallings, "Understanding Federated Identity", retrieved on Apr. 23, 2008 at <<http://www.networkworld.com/news/tech/2007/090307techupdate.html?page=1>>, Network World, Aug. 31, 2007, pp. 1-5.

U.S. Appl. No. 11/969,456, filed Jan. 4, 2008, Cross et al., "Selective Authorization Based on Authentication Input Attributes", 46 pgs.

Final Office Action for U.S. Appl. No. 11/969,456, dated Jun. 29, 2011, David B. Cross, "Selective Authorization Based on Authentication Input Attributes", 24 pgs.

Office action for U.S. Appl. No. 11/969,456, dated Dec. 11, 2012, Cross et al., "Selective Authorization Based on Authentication Input Attributes", 37 pages.

Office action for U.S. Appl. No. 11/969,456, dated May 22, 2012, Cross et al., "Selective Authorization Based on Authentication Input Attributes", 32 pages.

Phiri, et al., "Modelling and Information Fusion in Digital Identity Management Systems", Proceedings of the International Conference on Networking, International Conference on Systems and International Conference on Mobile Communications and Learning Technologies ICNICONSMCL Apr. 6, 2006, pp. 1-6.

* cited by examiner

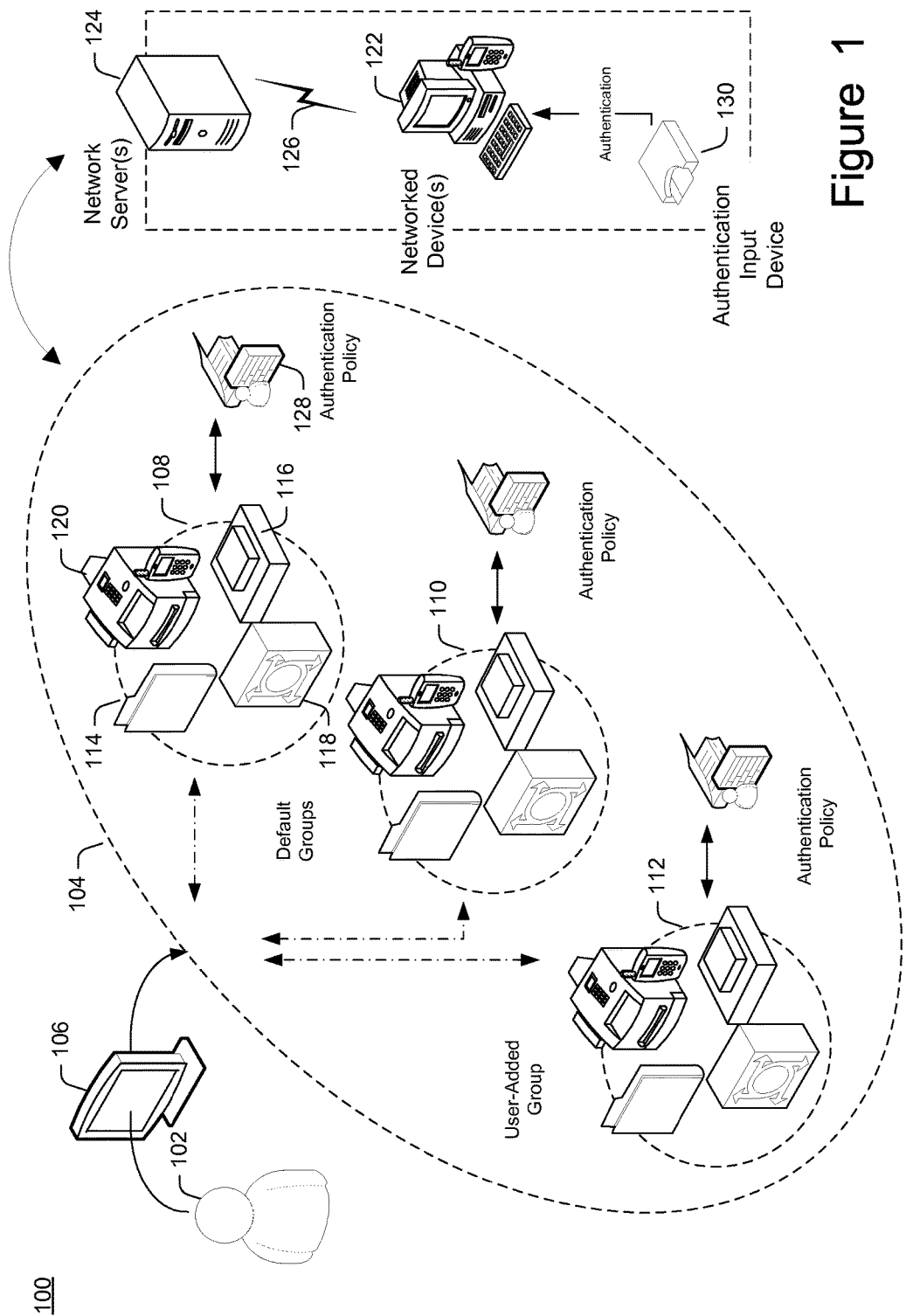

DIFFERENTIATED AUTHENTICATION FOR COMPARTMENTALIZED COMPUTING RESOURCES

BACKGROUND

Contemporary graphical user interface-based computer operating systems generally utilize user profiles to differentiate between users. For example, a particular user may be prompted to log in, that is, authenticate to a user profile established on an operating system before gaining access to a desktop environment of the system. In some operating systems, the user may authenticate to a desktop environment by supplying a user identity. In other systems, the logon may include both supplying a user identity and another authentication input, such as a password or biometric data.

Once a user gains access to a desktop environment using a particular user profile, the underlying operating system generally determines a user's ability to access data and computing resources based on the user profile. Depending on the access privileges associated with a particular user profile, a user may be granted access to certain computing resources, but denied access to other computing resources. However, unless the particular user profile is configured to enable the user to modify the user's own access privileges, the user is unlikely to have recourse once access to a computing resource is denied. In other words, existing user authentication and log in methods for operating systems generally provide only one type of access per user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for implementing differentiated authentication for accessing groups of compartmentalized computing resources, as well as accessing each compartmentalized computing resources, as displayed on the desktop of an operating system. In one embodiment, a method includes organizing one or more computing resources accessible in a desktop environment into a group. The method also includes providing an authentication policy for actions that can be performed on each computing resource. The authentication policy is configured to associate an authentication input to each action, or group of actions, for a particular computing resource. The method further includes receiving an authentication input when the user intends one of the actions on a particular computing resource. The method additionally includes allowing the user to perform the action on the particular computing resource when the received authentication input enables the intended action. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 1 is a block diagram illustrating an exemplary scheme for organizing computing resources into groups for implementing action-dependent differentiated authentication for compartmentalized groups.

DETAILED DESCRIPTION

Figure 2A:
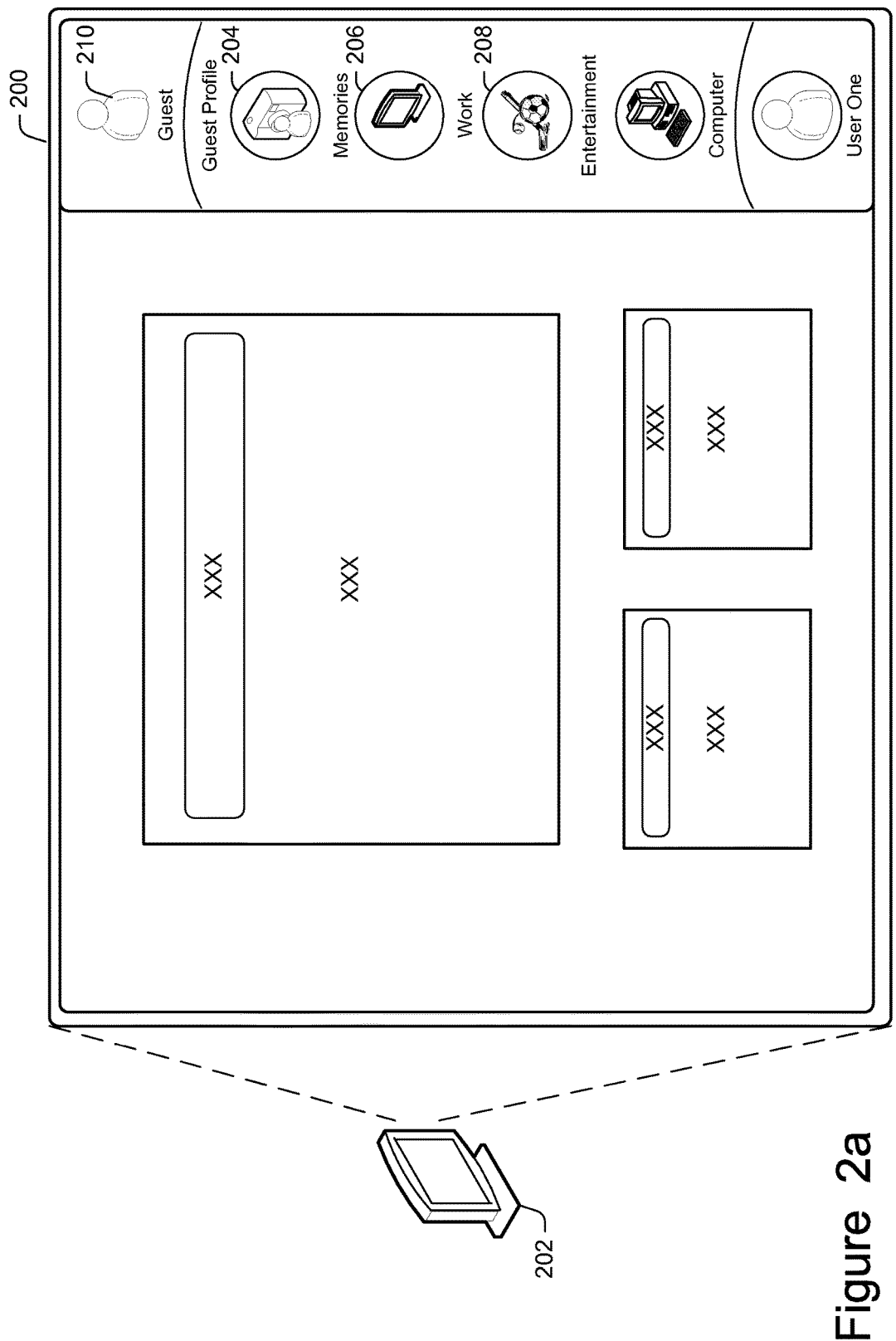
FIGS. 2a-2f are exemplary screen renderings illustrating interfaces for interactions with the computing resources and groups of computing resources as implemented in the exemplary scheme shown in FIG. 1, in accordance with at least one embodiment.

This disclosure is directed to embodiments that facilitate differentiated authentication for actions performed on groups of compartmentalized computing resources, as well as actions performed on each compartmentalized computing resource, as displayed on a desktop environment of an operating system. The computing resources may include data content, an application, a network portal, and a device.

Currently, many user authentication methods may not allow data and computing resources of varied importance to be protected by authentication methods of different robustness. For instance, critical financial information and non-critical downloaded music files may be protected by the same authentication method the user initially used to gain access to a desktop environment of the operating system. The authentication method may range from a simple password to a biometric logon that is difficult to circumvent. The use of such homogeneous user-centric authentication by operating systems may lead to inadequate protection for critical data and/or overly complex authentication process for accessing less critical data. Additionally, the reliance on an operating system to store user profiles containing user privileges provides limited portability. For instance, when a user migrates to a different computer or obtains a different version of the operating system on the same computer, the associated user profile may be lost or corrupted unless the user takes active steps to backup, transfer, and restore the user profile.

The differentiated authentication schemes described herein may reduce or eliminate the need to depend on the desktop environment of a computing device to provide user authentication to safeguard data and prevent unauthorized access to computer resources. Furthermore, the authentication schemes may provide a single authentication process for accessing computing resources that are located on different networks and computing devices. The authentication schemes described herein may enable movement away from user identity and/or machine-based authentication to differentiated authentication based on one or more intended user actions.

The embodiments described herein are directed to providing different authentication methods for performing actions on the groups of computing resources and specific computing resources within the groups based on pre-established policies. For example, an authentication policy may specify that in order to modify the content of a data file, one of the approved users may need to submit a password, while in order to delete the file, that user may need to submit biometric information. In this way, embodiments of the present disclosure provide the capability to request authentication inputs of varied strength and type that may allow the intended actions of the user. Accordingly, protection of valuable or sensitive computing resources from unwanted intrusion may be enhanced while overly burdensome authentication methods for accessing less valuable or sensitive computing resources may be reduced or eliminated.

Moreover, the use of differentiated authentication methods for accessing different groups of computing resources and accessing specific computing resources in the groups may advantageously replace the use of user-centric and/or computing-device centric authentication, thereby enhancing the access of computing resources over a network. Various examples of facilitating differentiated access to networked resources based on the attributes of authentication inputs are described below with reference to FIGS. 1-9.

Exemplary Schemes

FIG. 1 illustrates an exemplary scheme 100 for implementing action-dependent authentication onto computing resources and groups of computing resources that are displayed to a user. The computing resources and groups of the same may be displayed on a desktop environment, such as one that is presented by an operating system of a personal computer (PC). The same computing resources and groups may also be displayed in other visual representations, such as, but is not limited to, the work interface environment presented by the operating system of a smart phone. Additionally, each group and/or computing resource may be provided with its independent authentication policy based on the identity of one particular user and an action of the particular user. Moreover, once authenticated, the user may have the ability to perform an identical action on the same group or computing resource on different computing devices without repeating an authentication process.

As shown in FIG. 1, a user 102 may access a work environment 104 via a user interface 106 of a computing device. The work environment 104 may include a desktop environment of a PC, or any work interface environment presented by other computing devices. In accordance with some embodiments, the work environment 104 may be configured such that no authentication input is necessary when environment is presented to the user for the first time.

The work environment 104 may include one or more groups, such as groups 108, 110 and 112. Each of the groups may include one or more computing resources. The one or more computing resources may include at least one of data content 114, one or more applications 116, one or more network portals 118, and one or more devices 120. The users may interact with the one or more computing resources through the user interface 106. Data content 114 may include any discrete data entity that is typically stored on a computer. For example, such data content may include, but are not limited to, documents, audio files, video files, multimedia files, application files, electronic message files, and the like. The one or more applications 116 may include, but is not limited to, any software that operates on operating system. Typical applications include, but are not limited to, office productivity software, network and communication software, programming software, multimedia software, and the like.

Further, the one or more network portals 118 may include any gateway to a networked environment. For instance, network portals may include, but are not limited to, Internet websites, intranet websites, file transfer protocol (ftp) sites, and the like. Additionally, the one or more devices 120 may include any computing hardware or associated peripherals that are capable of directly or indirectly connecting to a networked computing environment. For example, devices may include, but are not limited to, desktop and mobile personal computers (PCs), personal digital assistants (PDAs), smart phones, printers, multifunctional networked office devices, digital multimedia players, and the like.

Each group of computing resources may be organized based on one or more criteria. These criteria may include, but are not limited to, usage pattern of a user, security requirements of the one or more computing resources, reliability of the one or more computing resources, and performance demand of the one or more computing resources. By way of example rather than limitation, the group 108 may be a group called "Memories" that is established based on usage pattern. In this example, data content 114 of the group 108 may include a collection of photographs, a collection of videos, and a collection of personal documents. The group 108 may also include one or more applications 114 that are necessary for the viewing and modification of the data content 116, i.e., photographs and videos. Thus, the applications 116 may include photograph, video, and document viewing and editing software. Network portals 118 of the group 108 may include websites that enable the online sharing of documents, videos and photographs via the Internet. Further, the group 108 may also include devices 120 that facilitate the distribution and collection of documents, photographs and video. Such devices 120 may include digital still and motion video cameras, printers, fax machines, scanners, smart phones, and the like. In one embodiment, the group 108 may include file and directory data for user interface software of the devices 120, thereby including the devices 120 into the group 108.

As further described above, a particular computing resource group may also be established based upon security concerns. In another example, the group 108 may be an established group called "Finance". In such a group 110, the data content 114 may include security-sensitive financial documents, (e.g., tax return documents, financial reports, bank statements, etc). The network portals 118 may include websites for banks, brokerage firms, and other financial institutions. The applications 116 may include applications that electronically store and process the security-sensitive financial documents.

In another instance, reliability concerns may lead to the establishment of a group 108 that includes applications 116 that are beta software, e.g., pre-lease versions of software that are prone to failure. The network portals 118 may include websites that are suspected phishing sites. The devices 120 may include legacy computing devices that need special software support and/or user care to support applications 116. By way of another example, performance demands may prompt the creation of the group 108 that includes computing power-intensive games in the applications 116. The network portals 118 may include multimedia streaming websites that demand large amounts of network bandwidth or full-screen access to the user interface 106. It will be appreciated that while the organization of various computing resources into a group, such as the group 108, based on some criteria are illustrated in the examples described above, the organization of computing resources into various groups may be based on any criteria deemed appropriate by a user. Thus, the above criteria are examples rather than limitations. According to some embodiments, the work environment 104 may include default groups that have been pre-established, as well as user added groups.

According to various embodiments, the computing resource in each group, such as the group 108, may be organized into the group by the creation of "virtual" associations between the computing resources and/or the group. In one instance, a computing resource group may be created using the file and directory data of each computing resource. Additionally, these "virtual" associations that constitute the groups may be "stored" in a variety of computing devices. For example, the "virtual" associations may be stored in one or more of the networked devices 122. Alternatively, the "virtual associations" may be stored in the network server 124. The networked devices 122 may include devices such as, but not limited to, PCs, smart phones, laptops, etc. The network server 124 may be connected to the one or more networked devices via a network infrastructure 126. The network infrastructure 126 may include at least one of a wide-area network (WAN), a local area network (LAN), and the like.

Moreover, the actual computing resources may reside on different computing devices, such as the networked devices 122 and a network server 124. For example, data content 114 may be stored on one of the networked devices 122 that is a desktop PC, while the applications 116 may be installed on a second of the networked devices 122 that is a laptop. Moreover, information for accessing the network portals 118 may be stored on a network server 124, and devices 120 may be physically connected to yet another of the networked devices 122. In this way, this "virtual" association between the groups of computing resources from different computing devices may enable the groups of computing resources to be accessible from anywhere, rather than being accessible only from a designated computing device. Further, these examples are in no way intended to be limiting, as there are multiple permutations as to which of the networked devices 122 and servers 124 on which the respective computing resources may reside.

Each of the groups of computing resources may further include one or more authentication policies. For example, group 108 includes authentication policy 128. The authentication policy 128 may be configured to designate the appropriate authentication input for each action a user intends on each group, or each computing resource in each group. The authentication inputs may vary in type and strength.

The type of the authentication input is the nature of the input (e.g., password, biometric data, security certificate, etc). For example, the authentication input may be a user logon and password combination, an authentication certificate embodied in a smart card, or a biometric input. Further, the strength of the authentication input refers to the resistance of the authentication input to tampering or circumvention. This resistance may be based on the permutational or cryptographical complexity of the authentication input. Typically, but certainly not exclusively, the strength of an authentication input, or permutational complexity, is measured and compared in a quantitative manner. For example, a 10-character password may have greater strength (entropy) than a 5-character password. On the other hand, the strength of the security certificate is generally dependent on the sophistication of the encryption (cryptographical complexity) and the protection provided to the private key.

In various embodiments, an authentication policy may designate authentication of various strength for different types of actions. For example, actions of the "reader" type, that is, actions that perform read-only function on the computing resources in a group, may have the least strength of authentication, On the other hand, actions of the "contributor" type, that is, actions that perform read and write access to the computing resources in the group, may have a comparatively greater strength of authentication. Further, actions of the "administrator" type may have the highest strength of authentication and allow full control of all of the computer resources in the group.

Thus, for instance, when the user expresses intent to open a particular document from the data content 114 for viewing, the authentication policy 128 may dictate that an appropriate logon and password combination (type) be utilized, wherein the password is of at least 5-characters (strength). The user may express the intent by selecting an "open" command for the particular document. However, when the user expresses intent to delete the particular document from the data content 114 (e.g., selecting a "delete" command), the authentication policy 128 may dictate that the user submit a software authentication certificate (type) that uses 128-bit encryption (strength). The user may submit a software authentication certificate, as well as other authenticators (e.g., hardware authentication certificate and a private key, biometric data), via an authentication input device 130 that is connected to one of the networked devices 122 and network servers 124. The authenticator input device 130 may be connected in such a way as to enable the submitted authenticator to be verified using the one or more authentication policies. The authentication input device 130 may be one of, but certainly not limited to, a biometric reader, a smart card reader, a radio-frequency identification (RFID) reader, as well as other data readers.

It will be appreciated an authentication policy associated with a computing resource group, such as authentication policy 128 for group 108, may also cover other action that the user may intend on each group or each computing resource in each group. These other actions may include, but are not limited to, accessing, creating, adding, modifying, moving to a different hierarchical file directory location, and the like. Accordingly, each of these actions may be associated with a different authentication input. Nevertheless, in some embodiments, the authentication policy may dictate an identical authentication input to a plurality of actions that the user intends on each group, or each computing resource in each group. In other embodiments, the authentication policy for a group may dictate that no authentication input is necessary for some actions performed on a group or a computing resource in a group.

As described above, the use of authentication policies that enables differentiated authentication based on the intended actions of the user may replace the use of authentication prompts at the initial startup of a work environment of an operating system, such as the work environment 104, without comprising security. This substitution is illustrated in FIG. 2a.

FIG. 2a illustrates an exemplary screen rendering that shows an interface display 200 for a work environment, such as the work environment 104 (FIG. 1), which displays groups of computing resources, such as the groups 108-112 (FIG. 1), in accordance with various embodiments. The work environment may be presented on the display 202 of a computing device. The computing device may be one of the networked devices 122 (FIG. 1). In the work environment, each group of computing resources may be represented by an icon. For instance, the group 108 may be represented by icon 204, the group 110 may be represented by icon 206, the group 112 may be represented by the icon 208, and so on and so forth.

The work environment interface display 200 may be displayed at the startup of an operating system responsible for generating the work environment. Instead of requesting authentication from the user 102 (FIG. 1) at the startup, the operating system responsible for generating the work environment may automatically authenticate the user 102 using a default "guest" identity, (as represented by the graphical icon 210). Thus, the user 102 may be provided with immediate access to the desktop environment, as well as the computing resources that are organized in the groups. In various embodiments, the default "guest" identity may provide the user 102 with limited privileges, i.e., performing some type of actions, but not performing other types of actions. For example, when the user 102 is authenticated to the work environment as "guest", the user 102 may have the ability to view computing resources, but not manipulate the computing resources in other ways. The limitations of the "guest" identity are illustrated in FIG. 2b.

Figure 2B:
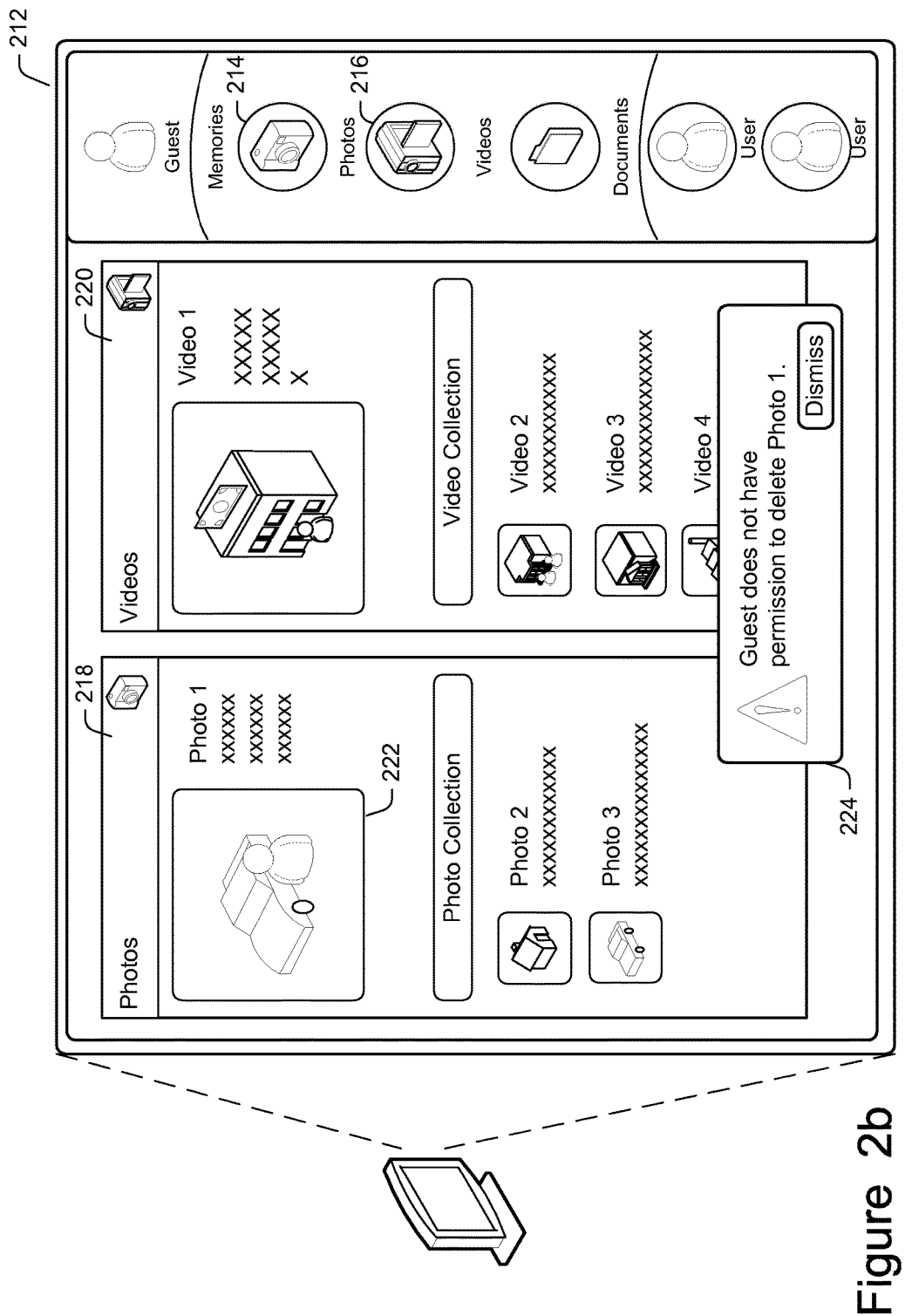

FIG. 2b illustrates a different exemplary interface display 212 for the same work environment where the user 102 (FIG. 1) has been authenticated as a "guest". As shown, the user 102 has already used the icon 204 (FIG. 2a) to access a group of computing resources. For example, where icon 204 leads to a group of computing resources called "Memories" (previous described in FIG. 1), data content may include photographs 218, as accessible for viewing via icon 214. Data content may also include videos 220, as accessible for view via icon 216. In one instance, the user 102 authenticated as "guest" may click on the icons 214 and 216 to freely view the photograph collections 218 and video collections 220, respectively. However, given the user's authentication identity as "guest", the authentication policy associated with the group may be configured to deny the user 102 permission to perform other types of action, such as delete photo 222, with regard to the photo collections 218. In one instance, the user 102 may be notified that the automatically provided authentication input, i.e., default "guest" identity, is insufficient to perform the deletion via notification 224.

Figure 2C:
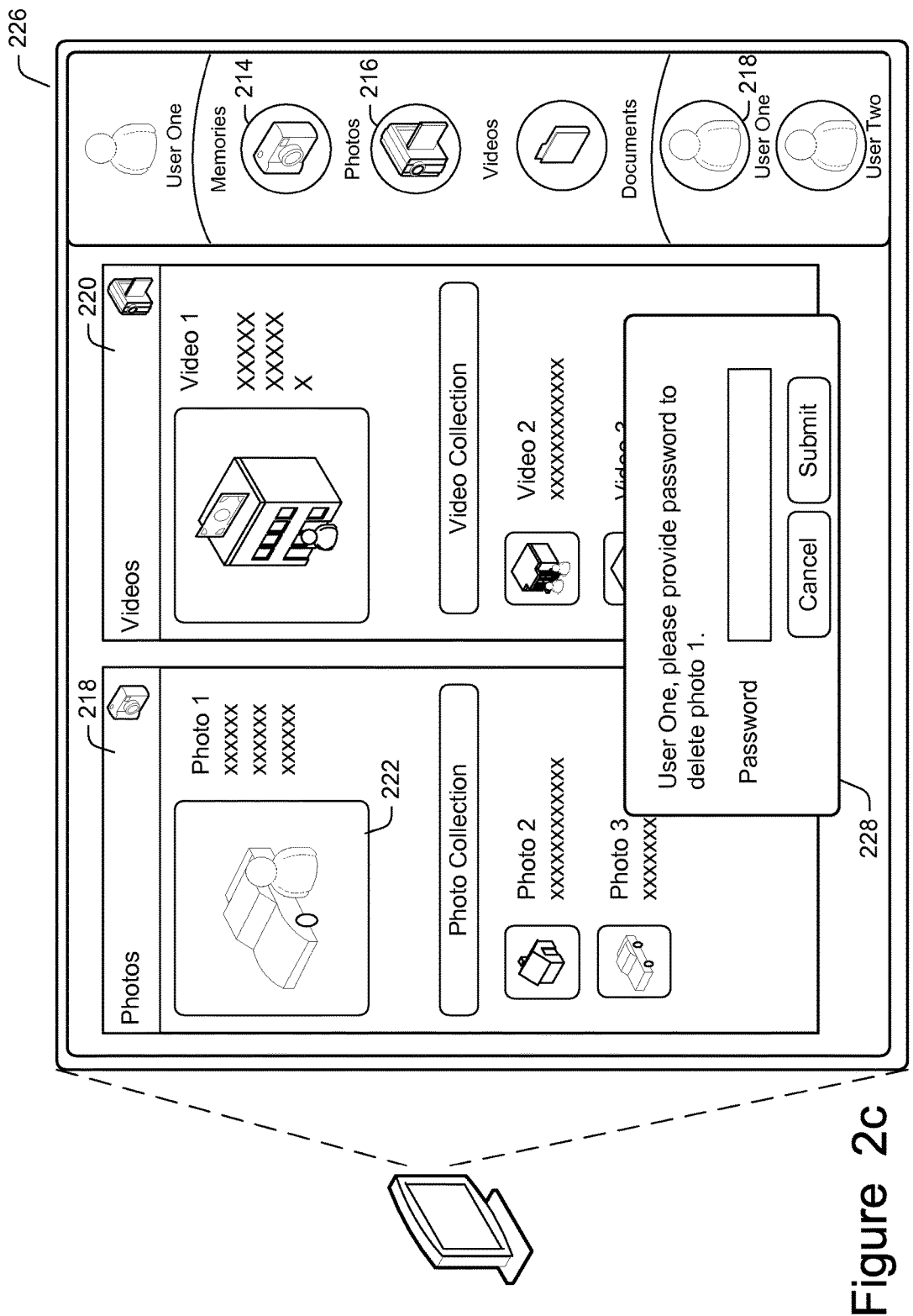

FIG. 2c illustrates another exemplary interface display 226 for the same work environment as in FIG. 2b, where the user 102 may be requested to supply an authentication input as needed to perform a particular intended action on a computing resource of a group. In this case, the user 102 may supply an alterative authentication input in the form of an identity and a password to perform the deletion of photo 222 described in FIG. 2b. The user 102 may have decided to supply the alternative authentication input due to the fact that the authentication policy for the computing resource group "Memories" does not permit the performance of a deletion action when the user 102 is authenticated using the default "guest" identity as described. Accordingly, the user 102 may supply a different authentication input by activating an icon 218 to submit a user identity to the authentication policy. The authentication policy for the group "Memories" may require that both a user identity and a password are needed to perform the deletion operation. Accordingly, a password prompt 228 may be presented to the user 102 so that the user may enter the password portion of the authentication input.

Subsequently, the user 102 may be granted the ability to delete photo 222 if the submitted identity and password inputs are valid. In some embodiments, the work environment may retain the submitted authentication input, in this instance identity and password. In the same example, the authentication policy for the group "Memories" may further dictate that a third form of authentication input is needed to perform yet another action on a computing resource. This third form of authentication input is illustrated in FIG. 2d.

Figure 2D:
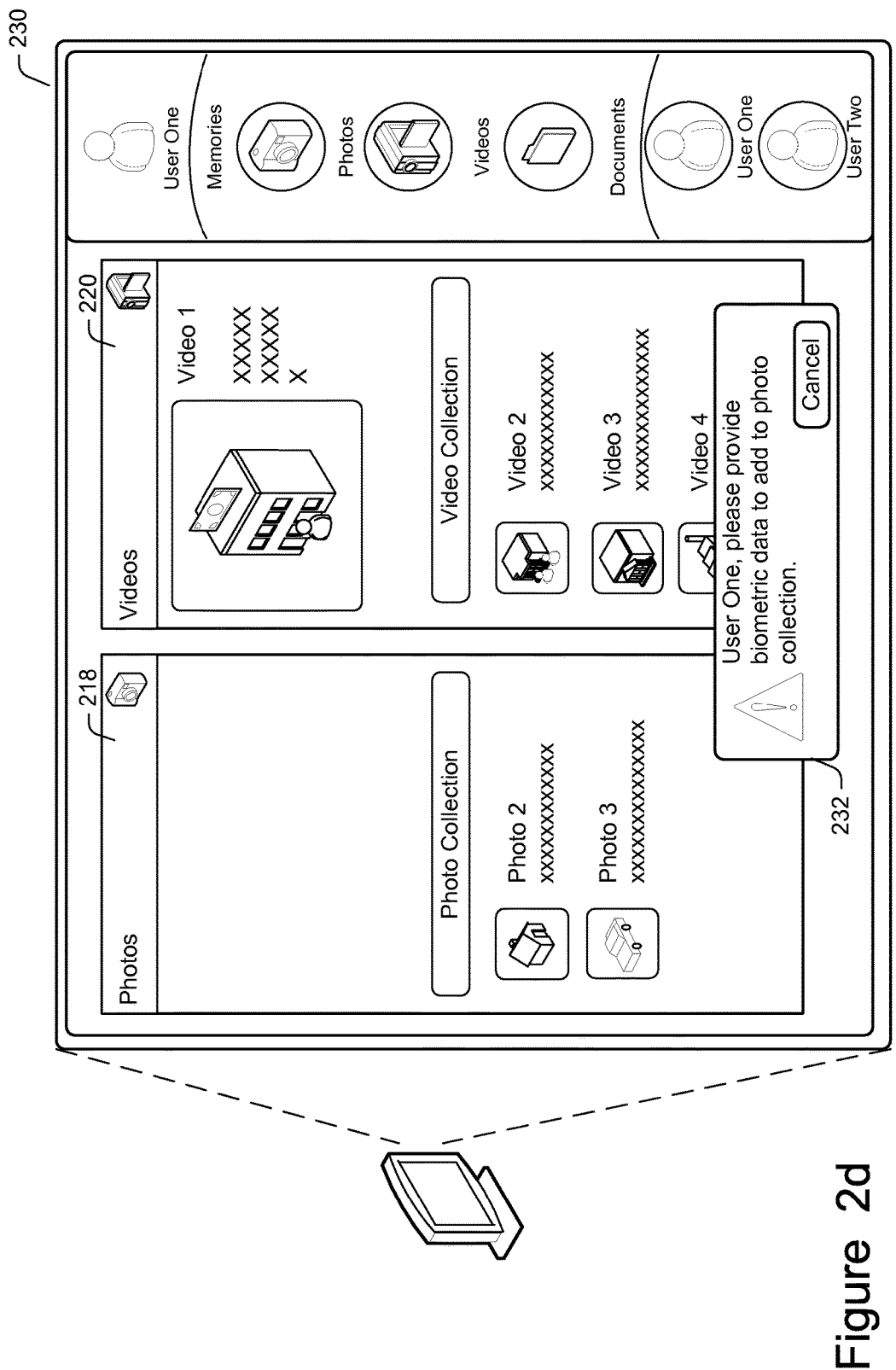

FIG. 2d illustrates an exemplary interface display 230 for the same exemplary work environment as in FIG. 2b. However, because the user 102 (FIG. 1) intends to perform yet another different type of action, e.g., adding to the data content (photograph collection 218), rather than the action of deletion as illustrated above, the user 102 may be prompted for another form of authentication input. For example, the authentication policy may require that both a user identity and a biometric input are needed to add a photograph to the photograph collection 218. Accordingly, an action prompt 232 may be presented to the user 102 to request the user to submit, e.g., biometric data to an authentication input device, such as the authentication input device 130. Subsequently, the user 102 may be permitted to add a photo to the photograph collection 218 if the submitted identity and biometric inputs are valid. In another example illustrated in FIG. 2e, the underlying operating system generating the work environment may be configured to command an authentication input device, such as the authentication input device 130, to automatically detect and receive of an authentication input when the user 102 intends to perform an action.

Figure 2E:
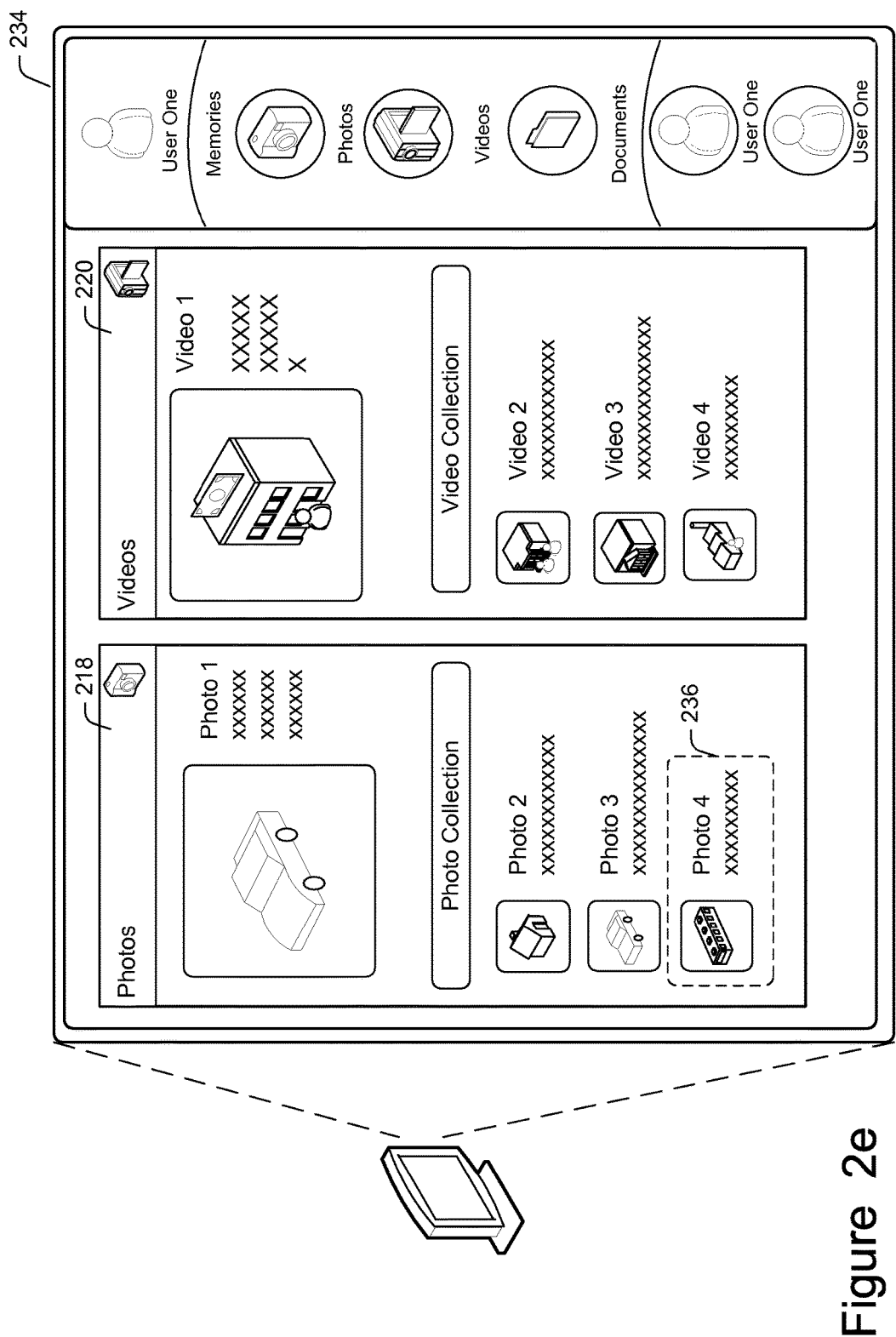

FIG. 2e illustrates an exemplary interface display 234 for the same exemplary work environment as in FIG. 2d. As illustrated in FIG. 2e, the user 102 intends to perform a specific type of action, i.e., adding a photograph 236 to the photograph collection 218. However, in this example, the authentication policy dictates that the user 102 (FIG. 1) must submit a software authentication certificate or a hardware certificate and a private key that is stored in a computer readable storage media. For example, the software authentication certificate may be stored in the memory of a smart phone, while the hardware authentication private key may be an algorithm that is hardwired into a portable integrated circuit card. Accordingly, when the operating system determines that an authentication certificate is needed to perform a particular action, the operating system may activate an authentication input device, such as input device 130 (FIG. 1), to detect the presence of the authenticator in the proximity of the authentication input device. For example, the authentication input device may be a Wi-Fi enabled device capable of detecting a smart phone in the proximity. The authentication input device may then automatically retrieve a software certificate and a private key from the smart phone. In another example, the authentication input device may read a hardware authentication certificate using radio-frequency identification (RFID) and/or other wireless communication technology.

As illustrated in the exemplary interface display 234, once the authentication input dictated by the authentication is submitted and verified to be valid, a photo, such as the photo 236, may be added to the photo collection 218. It will be appreciated that the since the authentication input dictated by the authentication policy may be automatically provided to the operating system, the need for the user 102 to supply the authentication input may be eliminated.

Figure 2F:
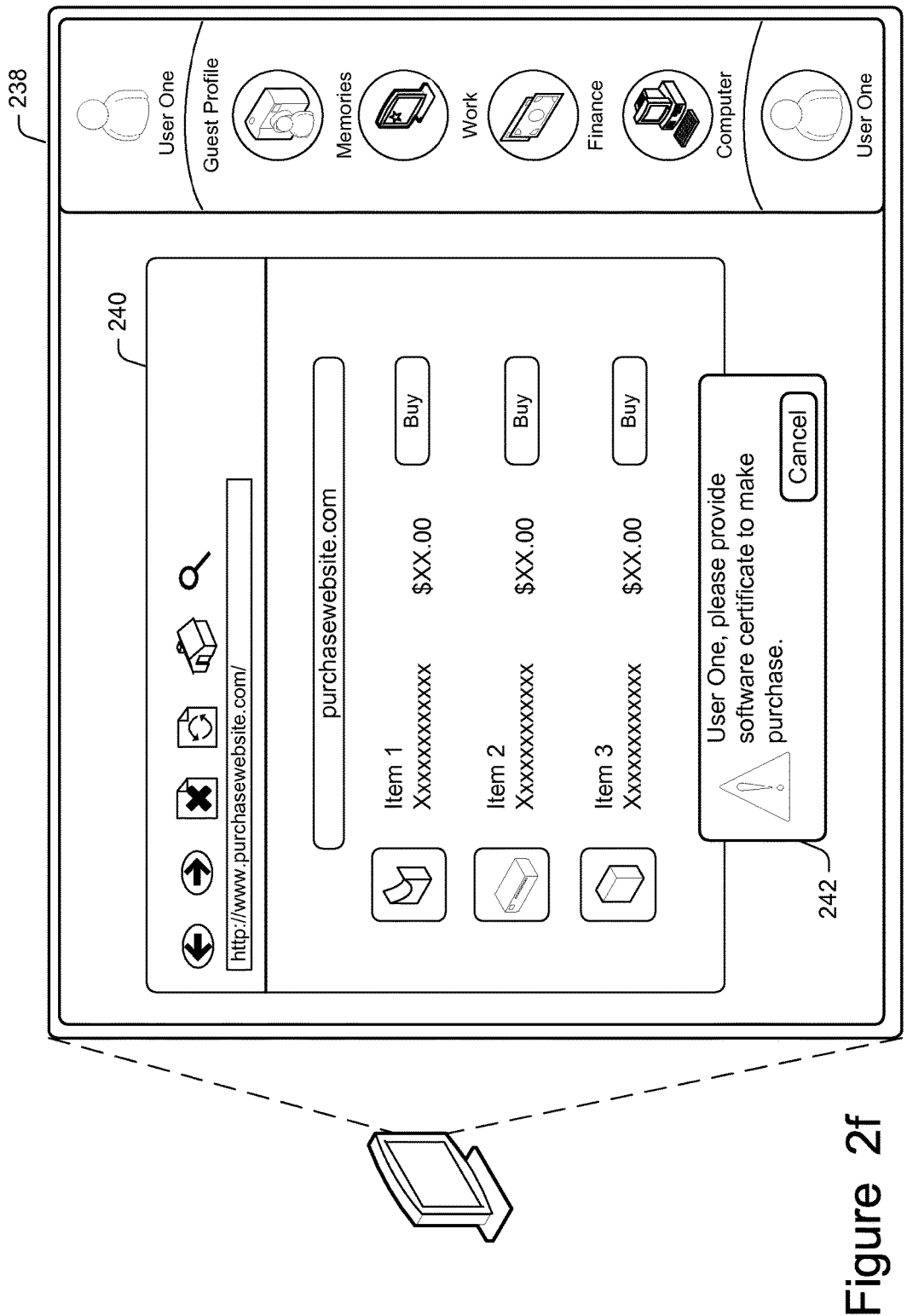

FIG. 2f illustrates an exemplary interface display 238 for an exemplary work environment, such as the work environment 104 (FIG. 1). The exemplary interface display 238 demonstrates differentiated authentication based on the user's intended actions on a network portal of a computing resource group, such as one of the network portals 118 (FIG. 1). As shown, the user 102 (FIG. 1) intends to make a purchase at an online website. In this example, the authentication policy may dictate that while the user is free to browse through any website without providing an authentication input, the user is required to provide an authentication input when the user 102 intends to authorize payment to make a purchase from a particular website. Accordingly, the authentication policy for the group may dictate that the user provide an authentication input that includes a user identity and an associated software certificate and a private key. The need to provide the authentication input may be trigger when the user loads an online shopping cart or loads a secure transaction page.

In another embodiment, the authentication policy dictates that the user 102 submit an authenticator (e.g., hardware or software authentication certificate and a private key) to make a purchase. In such an embodiment, the operating system generating the exemplary work environment may automatically command an authentication input device 130 (FIG. 1) to locate the authenticator. Thus, the user 102 may be automatically authenticated to make a purchase. However, if the input device 130 is unable to locate an authenticator in the immediate vicinity, the user may be requested to actively provide the software certificate and a private key to the authentication input device via prompt 242.

It will be further appreciated that, while FIGS. 2a-2f shows various authentication input methods for various user actions, the examples are intended to be illustrative rather than limiting. It will be further appreciated that while differentiated authentication based on the actions that the user intends to perform on computing resources in groups are illustrated above, differentiated authentication may also be implemented on the groups themselves. For example, the authentication policy may dictate that a first type of authentication input is needed to view a group (e.g. group 108), while a second authentication input is needed to delete the group.

Figure 3:
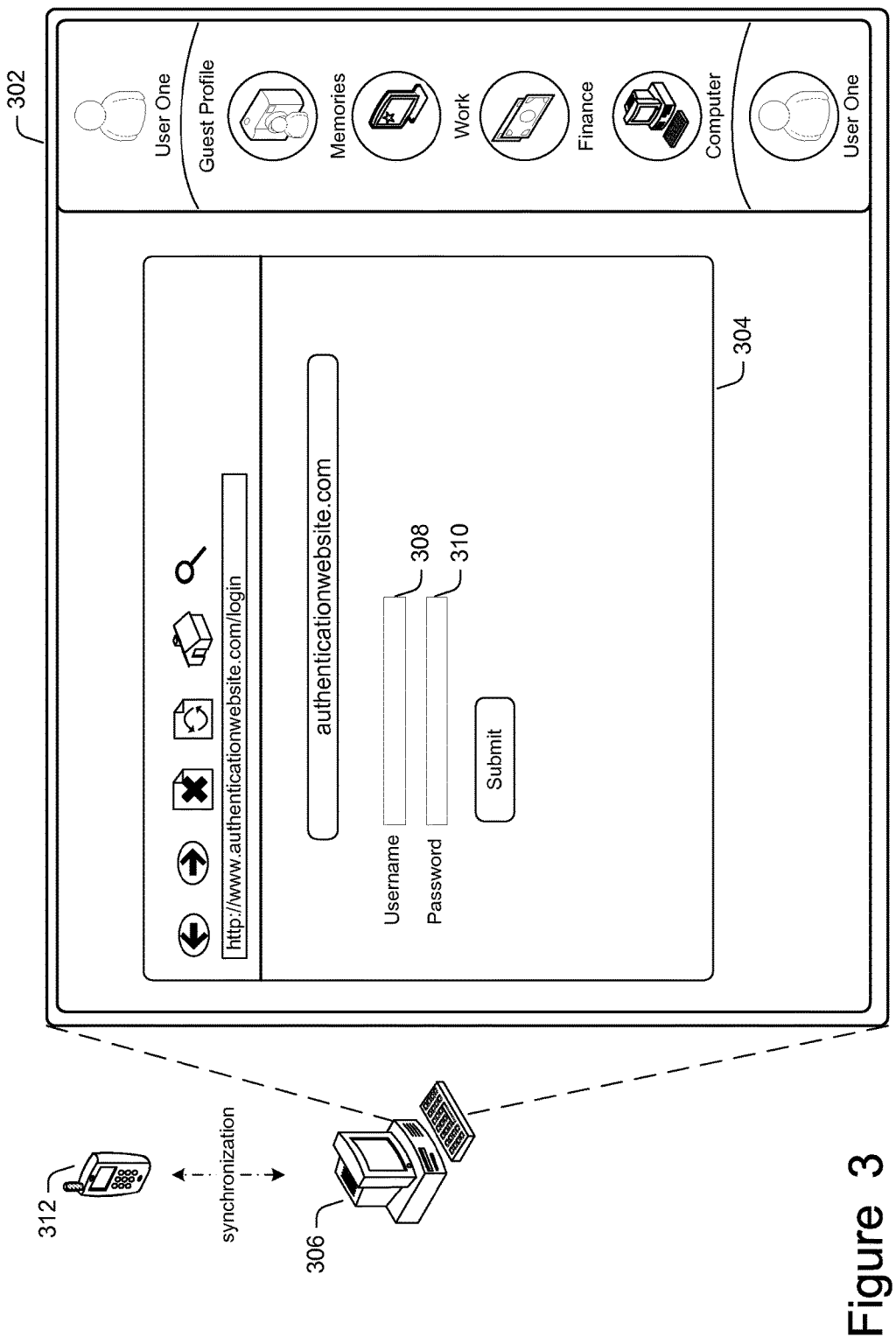
FIG. 3 is a block diagram that illustrates synchronization between computing resources, as implemented in the exemplary scheme shown in FIG. 1, in accordance with at least one embodiment.

FIG. 3 illustrates synchronization between computing resources, in accordance with at least one embodiment. As shown in exemplary interface display 302, the user, such as user 102, may authenticate to a network portal that is a website 304 using a web browser. The web browser may be a software application residing on a networked device 122, such as a personal computer (PC) 306. In one instance, the user 102 may accomplish this by providing an authentication input in the form of a user name 308 and password 310. The website may be a portal for a financial institution where the user can obtain personal banking information. Following the provision of a valid user name and password, the user 102 may access a secured portion of the website, so as to conduct banking business on the website and, optionally, on local work environment 104 (FIG. 1) by communicating the authentication information from the website.

Accordingly, the work authentication policy may be configured so that synchronization of authentication may occur between the networked PC 306 and a second networked device 122, such as a smart phone 312. Thus, because the user 102 has already authenticated to a secured portion of the website on the networked PC 306, the user 102 may be able to access the same secured portion of the website on the smart phone 312 without having to provide additional authentication input on the smart phone 312. The synchronization may be carried out by the operating system that implements the authentication policy. It will be appreciated that synchronization for the purpose of accessing the secured portion of a website on two different devices is an exemplary form of synchronization between various computing resources that are organized into a single group. Other synchronizations may include synchronization of email applications residing on two different networked devices, or the synchronization of other devices for the exchange of data.

Figure 4:
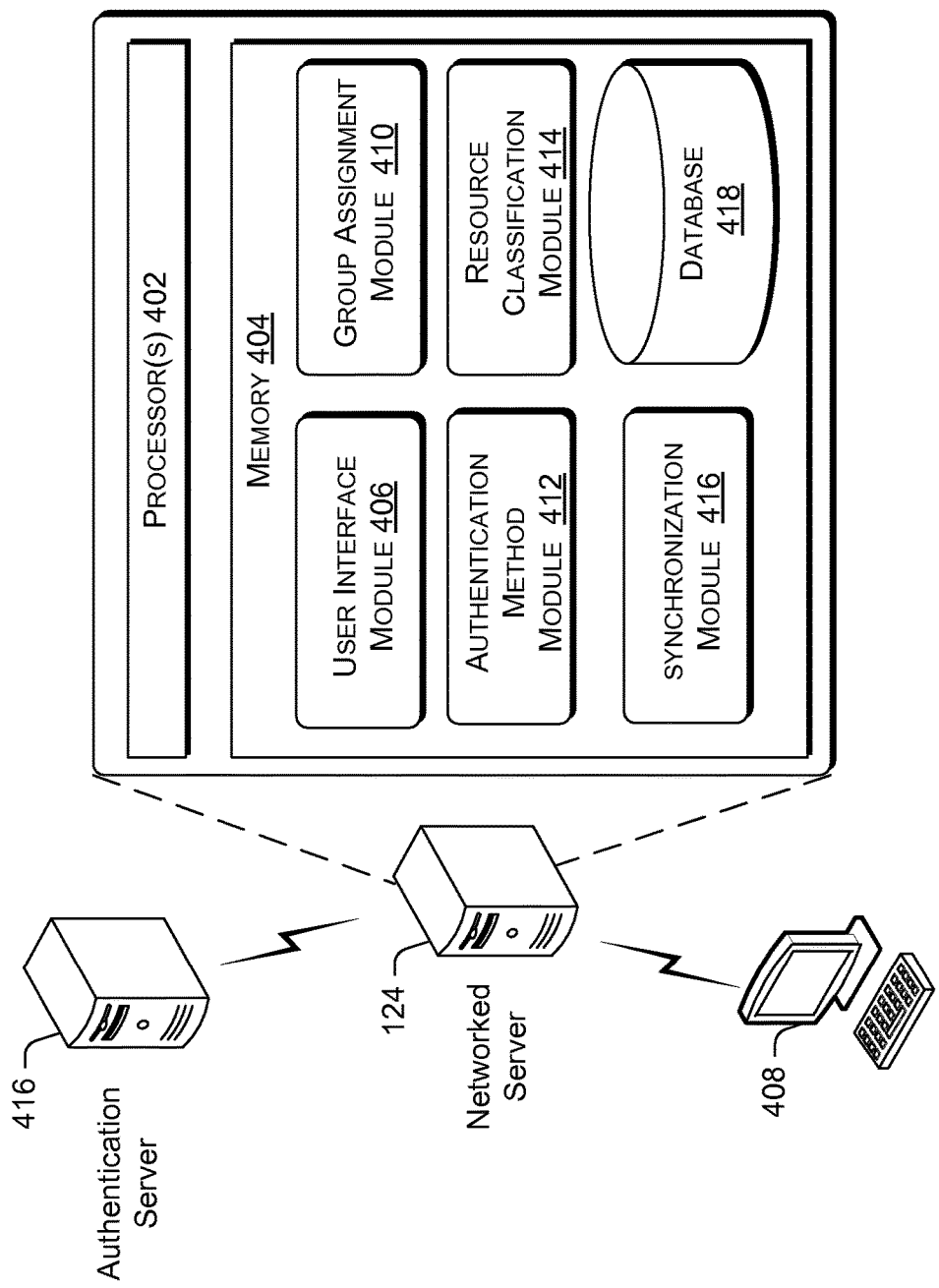
FIG. 4 is a block diagram illustrating selected computing resources of an exemplary network server for implementing differentiated authentication for compartmentalized groups of the exemplary scheme shown in FIG. 1, in accordance with at least one embodiment.

FIG. 4 illustrates selected components of the exemplary network server 124. The network server 124 may include one or more processors 402 and memory 404. The memory 404 may include volatile and/or nonvolatile memory, removable and/or non-removable media implemented in any method or technology for storage of information, such as computer-readable instructions, data structures, program modules or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 404 may store program instructions. The program instructions may provide differentiated authentication methods based on user-intended actions on each of a plurality of groups of computing resources, as well as in each of a plurality of the computing resources themselves. Program instructions, or modules, may include routines, programs, objects, components, and data structures that perform particular tasks or implement particular abstract data types. The selected program instructions may include a user interface module 406 that interacts with a user interface 408, a group assignment module 410, an authentication method module 412, a resource classification module 414, a synchronization module 416, and a database 418. In some embodiments, exemplary network server 124 may include other components that provide authentication services. In other embodiments, the network server 124 may communicate with an authentication server 416 to authenticate users. By example, but not limitation, the authentication server 416 may control access to one or more portions of a network, as well as grouped computing resources.

The user interface module 406 may be configured to receive input from the user interface 408. In various embodiments, the user interface 408 may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods. In various embodiments, the user interface 408 may be part of the network server 124 and/or one of the networked devices 122 (FIG. 1).

The group assignment module 410 is configured to provide a plurality of computing resources to a user via a user interface 408 through the user interface module 406. Additionally, the group assignment module 410 may also enable the user to select and group one or more computing resources into at least one group. Following user input, the group assignment module 410 may group the computing resources by creating "virtual" associations between the computing resources and/or the group. In one instance, a group may be created using the file and directory data of each computing resource. Thus, the group of computing resources by the group assignment module 410 may be based on correlating and storing file and directory data for computing resources so that the computing resources are accessible from one or more group representations. It will be appreciated that the actual computing resources may be located in a plurality of different locations. As described above, the computing resources may include data content, applications, network portals, and computing devices.

Furthermore, the group assignment module 410 may be further configured to enable the user to create new groups of computing resources, wherein each new group includes computing resources that meet certain predetermined criteria. For example, as previously described, computing resources may be organized into groups based on, but certainly not limited to, criteria such as usage patterns, security requirements, reliability of the one or more computing resources, and performance demand of the one or more computing resources. In some embodiments, the group assignment module 410 may enable the user 102 to define groups and group computing resources via a work environment, such as the work environment 104, which is displayed on one of the networked device 122.

The authentication method module 412 may be configured to enable a user to assign an authentication input method for each intended action on a computing resource or a group of computing resources. In some embodiments, at least some of the intended actions may be assigned the same authentication input method. In other embodiments, at least two intended actions for a computing resource and/or at least two intended actions for a group are assigned different authentication input methods. The authentication method module 412 may accomplish this by commanding the user interface module 406 to display a plurality of authentication input methods on the display of a user interface. For example, the authentication method module 412 may provide the user with a graphical interface menu to correlate each action on a group or a computing resource with a particular authentication input method. As described above, some actions for which authentication input methods may be assigned include, but not limited to, accessing, creating, adding, modifying, moving to a different hierarchical location, and other actions that otherwise manipulates a group or a particular computing resource. In some embodiments, the authentication method module 412 may enable the user 102 to assign authentication methods to actions on computing resources and/or groups via a work environment, such as the work environment 104, which is displayed on one of the networked device 122.

The resource classification module 414 may be configured to automatically classify computing resources into different groups. The operation of the resource classification module 414 is illustrated in FIG. 5.

Figure 5:
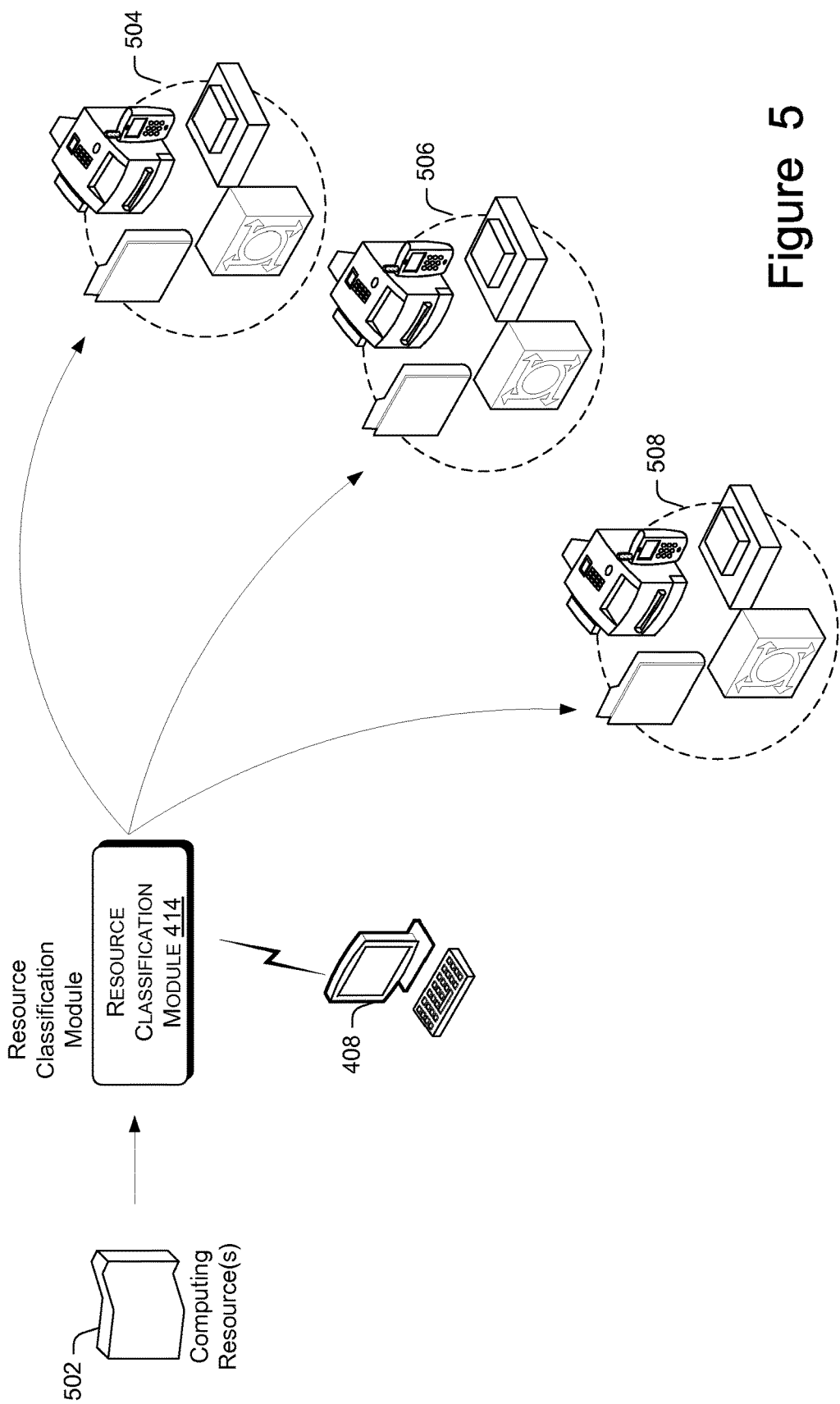
FIG. 5 is a block diagram illustrating a classifier that assigns content to different computing resource groups illustrated in the exemplary shown in FIG. 1, in accordance with at least one embodiment.

FIG. 5 is a block diagram illustrating a classifier that assigns a computing resource to different groups illustrated, in accordance with at least one embodiment. The classifier may be the resource classification module 414 (FIG. 4). As shown, the resource classification module 414 may be configured to classify one or more computing resources 502 into one of a plurality of computing resource groups, such as one of the groups 504, 506, 508. The computing resources 502 may include one of data content, an application, a network portal, and a device. In one illustrative instance, the computing resources 502 may be data content in the form of an email. Accordingly, resource classification module 414 may assign the email to a group based on one or more criteria. For example, when the group 504 includes computing resources that relate to "work", and group 506 includes computing resource that relates to "personal documents," the resource classification module 414 may assign incoming email to one of the groups 504 and 506 based on the originating email address. Accordingly, the resource classification module 414 may accomplish this because the user, such as user 102 had pre-established one or more criteria (e.g., emails originating from a first set of email addresses are to be placed in the "work" category, while emails from a second set are to be placed in the "personal document" category). In some embodiments, the resource classification module 414 may further have the capacity to monitor user usage patterns to assign computing resources to different groups based on the usage pattern. In the example with respect to emails, the resource classification module 414 may observe the user 102 assigning emails having different originating email addresses to different groups, and then when enabled, automatically replicate the assignment patterns for additional incoming emails. It will be appreciated that while the various functionalities of the resource classification module 414 have been described with respect to emails, the resource classification module 414 is also capable of classifying other computing resources, (e.g., applications, network portals, and devices) into different groups.

Returning to FIG. 4, the network server may further include a synchronization module 416. The synchronization module 416 may be configured to synchronize application settings, hardware settings, and access privileges for each group of computing resources. For example, as described above, the user 102 may authenticate to a secured portion of a financial website (network portal) to access sensitive data using a web browser on a first computing device (e.g., PC 306). In such an instance, the synchronization module 416 may ensure that the user 102 may access the same secured portion of the financial website on a second computing device (e.g., smart phone 312) without having to repeat the authentication. In other embodiments, the synchronization module 416 may ensure that application settings are consistent regardless of the computing device used to access the application to ensure seamless experience for the user 102.

The database 418 may be configured to store metadata regarding group organizations, as processed by the group assignment module 306. The metadata may include various "virtual associations" of file and directory data regarding the organization of one or more groups of computing resources. The database 418 may contain metadata for user-created groups and/or "default" groups of computing resources, wherein the "default" groups are pre-established for the convenience of the user. The database 418 may also include metadata related to particular authentication input methods assigned by the authentication method module 412 to individual actions for each of the computing resources and/or groups of computing resources. The database 418 may further include metadata for proper operation of the resource classification module 414 and the synchronization module 416. In some embodiments, the database 418 may store authentication input (e.g., identity, password, etc.) as obtained from a user via the user interface module 406. Furthermore, the database 418 may also store information that associates the received authentication input with the corresponding action intended by the user.

It will be appreciated that while the various modules have been described with respect to a network server 124, one or more of the modules may also reside on any computing device that the user uses to perform actions on groups and/or computing resources.

Exemplary Processes

Figure 6:
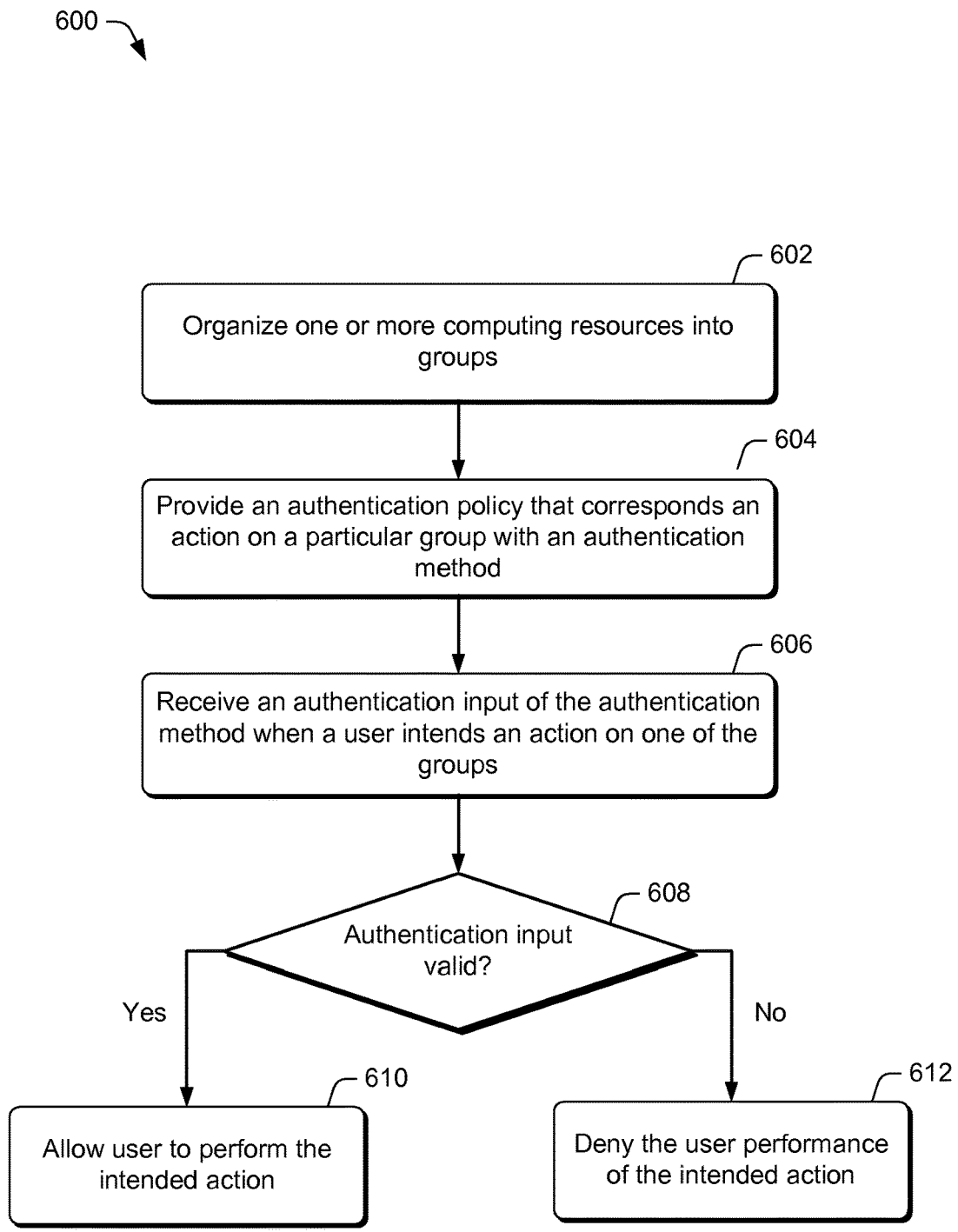
FIG. 6 is a flow diagram illustrating an exemplary process for providing differentiated authentication to computing resources in a group, as implemented on the exemplary scheme show in FIG. 1, in accordance with at least one embodiment.
Figure 7:
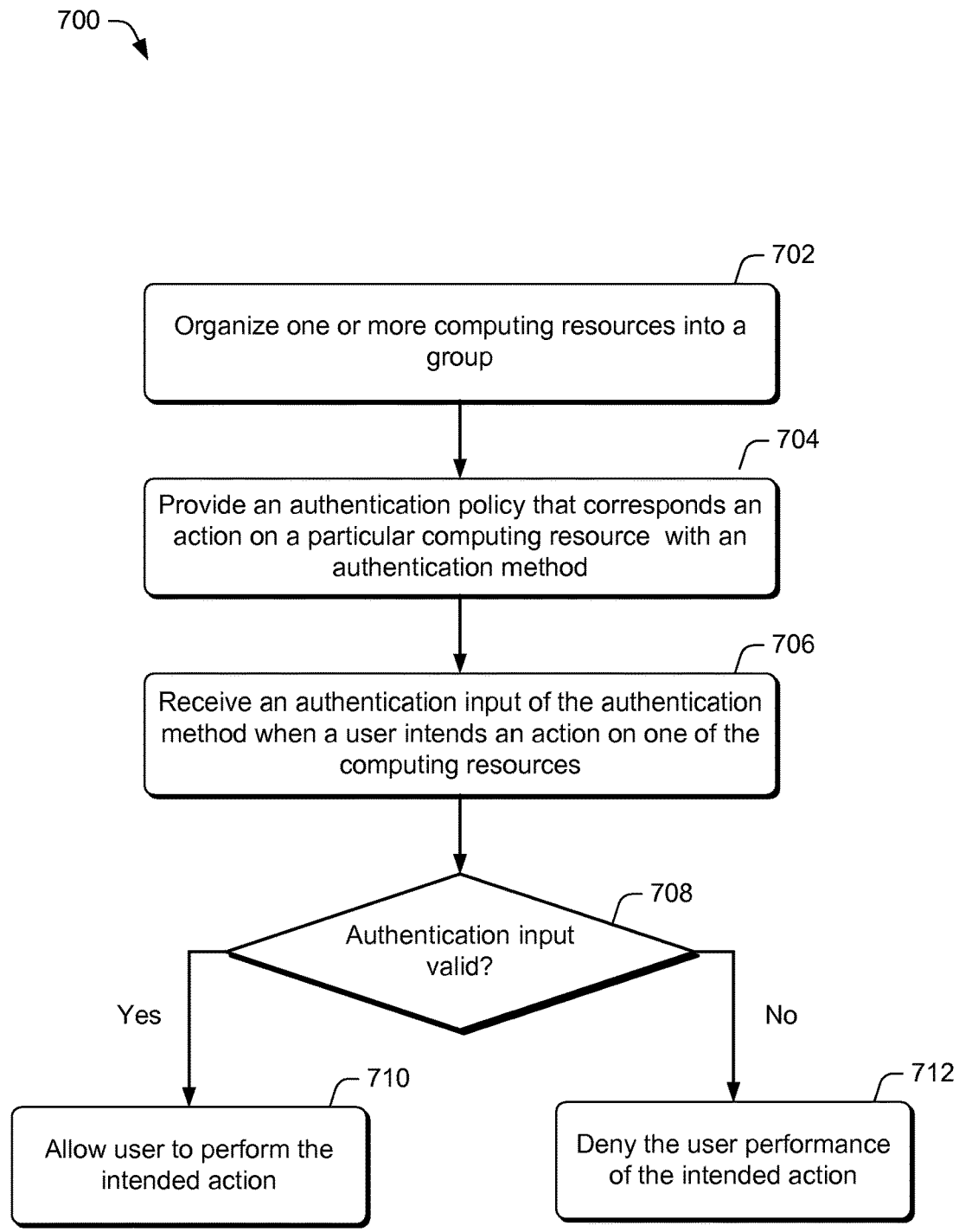
FIG. 7 is a flow diagram illustrating an exemplary process for providing differentiated authentication to groups of computing resources, as implemented on the exemplary scheme show in FIG. 1, in accordance with at least one embodiment.

FIGS. 6-7 illustrate exemplary processes that facilitate differentiated authentication based on the actions performed on each group of computing resource and/or each computing resource. The exemplary processes in FIGS. 6-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary network server 124 of FIG. 1, although they may be implemented in other system architectures.

FIG. 6 is a flow diagram illustrating an exemplary process 600 for providing differentiated authentication to computing resources in a group in accordance with at least one embodiment. At block 602, one or more computing resources are organized into a group. The group may be one of a plurality of groups. The computing resources may include at least one piece of data content, at least one application, a network portal, and/or a device. The computing resources may be organized into the group based at one or more pre-established and/or user-established criteria. The criteria may include but is not limited, usage pattern of a user, security requirements of the one or more computing resources, reliability of the one or more computing resources, and performance demand of the one or more computing resources. The metadata related to the organization of the computing resources into one or more groups may be stored in a computing device. The computing device may be a local device, that is, the same device that stores the computing resources (e.g., networked device 122). Alternatively, the computing device may be a networked device, such as the network server 124. In some embodiments, the metadata may be stored on a combination of a local device or a networked device.

At block 604, at least one authentication policy may be provided to the computing device. The authentication policy may associate a user-intended action on a particular group with an authentication input method. The user-intended action may be one of a plurality of different actions. These actions may include, but are not limited to, accessing, creating, adding, modifying, moving to a different hierarchical location, and other actions that otherwise manipulate the group. The authentication input method may be any method for authenticating a user's identity to access a computing resource. In various instances, the authentication input methods may include methods for inputting at least one of, but not limited to, identity, password, biometric data, a hardware identification device, and a software security certificate with a private key.

At block 606, an authentication input according to the input method may be received by a computing device that stores the authentication policy, such as the network server 124 (FIG. 1). The authentication input is received when the user intends an action on one of the computing resources. For example, the user may activate a command available in a work environment, such as the work environment 104. The activation of the command may then trigger the acquisition of the authentication input. The authentication input may be received on the same computing device, or a different computing device, as long as the computing device has access to the authentication policy.

At decision block 608, the received authentication input may be validated to determine whether access to the group should be granted for the performance of the intended action. In some embodiments, the received authentication input may be communicated to an authentication server, such as the authentication server 416, which is capable of verifying the authentication input. If the authentication input is valid, ("yes" at decision block 608), the process 600 may proceed to block 610. At block 610, the user is granted permission to perform the intended action on the group. However, if the authentication input is invalid ("no" at decision block 608), the process may proceed to block 612. At block 612, the user is denied permission to perform the intended action on the group.

FIG. 7 is a flow diagram illustrating an exemplary process 700 for providing differentiated authentication to computing resources in a group in accordance with at least one embodiment. At block 702, one or more computing resources are organized into a group. The group may be one of a plurality of groups. The computing resources may include one at least one piece of data content, at least one application, at least one network portal, and at least one device. The computing resources may be organized into the group based at one or more pre-established and/or user-established criteria. The criteria may include but are not limited, usage pattern of a user, security requirements of the one or more computing resources, reliability of the one or more computing resources, and performance demand of the one or more computing resources. The metadata related to the organization of the computing resources into one or more groups may be stored in a computing device. The computing device may be a local device, that is, the same device that stores the computing resources (e.g., networked device 122). Alternatively, the computing device may be a networked device, such as the network server 124 (FIG. 1). In some embodiments, the metadata may be stored on a combination of a local device or a networked device.

At block 704, at least one authentication policy may be provided to the computing device. The authentication policy may associate a user-intended action on a particular computing resource with an authentication input method. The user-intended action may be one of a plurality of different actions. These actions may include, but are not limited to, accessing, creating, adding, modifying, moving to a different hierarchical location, and other actions that otherwise manipulates the computing resource. The authentication input method may be any method for authenticating a user's identity to access a computing resource. In various instances, the authentication input methods may include methods for inputting at least one of, but not limited to, identity, password, biometric data, a hardware or a software security certificate with a private key.

At block 706, an authentication input according to the input method may be received by a computing device that stores the authentication policy, such as the network server 124 (FIG. 1). The authentication input is received when the user intends an action on one of the computing resources. For example, the user may activate a command available in a work environment, such as the work environment 104. The activation of the command may then trigger the acquisition of the authentication input. The authentication input may be received on the same computing device, or a different computing device, as long as the computing device has access to the authentication policy. At decision block 708, the received authentication input may be validated to determine whether access to the computing resource should be granted for the performance of the intended action. In some embodiments, the received authentication input may be communicated to an authentication server, such as the authentication server 416, which is capable of verifying the authentication input. If the authentication input is valid, ("yes" at decision block 708), the process 700 may proceed to block 710. At block 710, the user is granted permission to perform the intended action on the computing resource. However, if the authentication input is invalid ("no" at decision block 708), the process may proceed to block 712. At block 712, the user is denied permission to perform the intended action on the computing resource.

Figure 8:
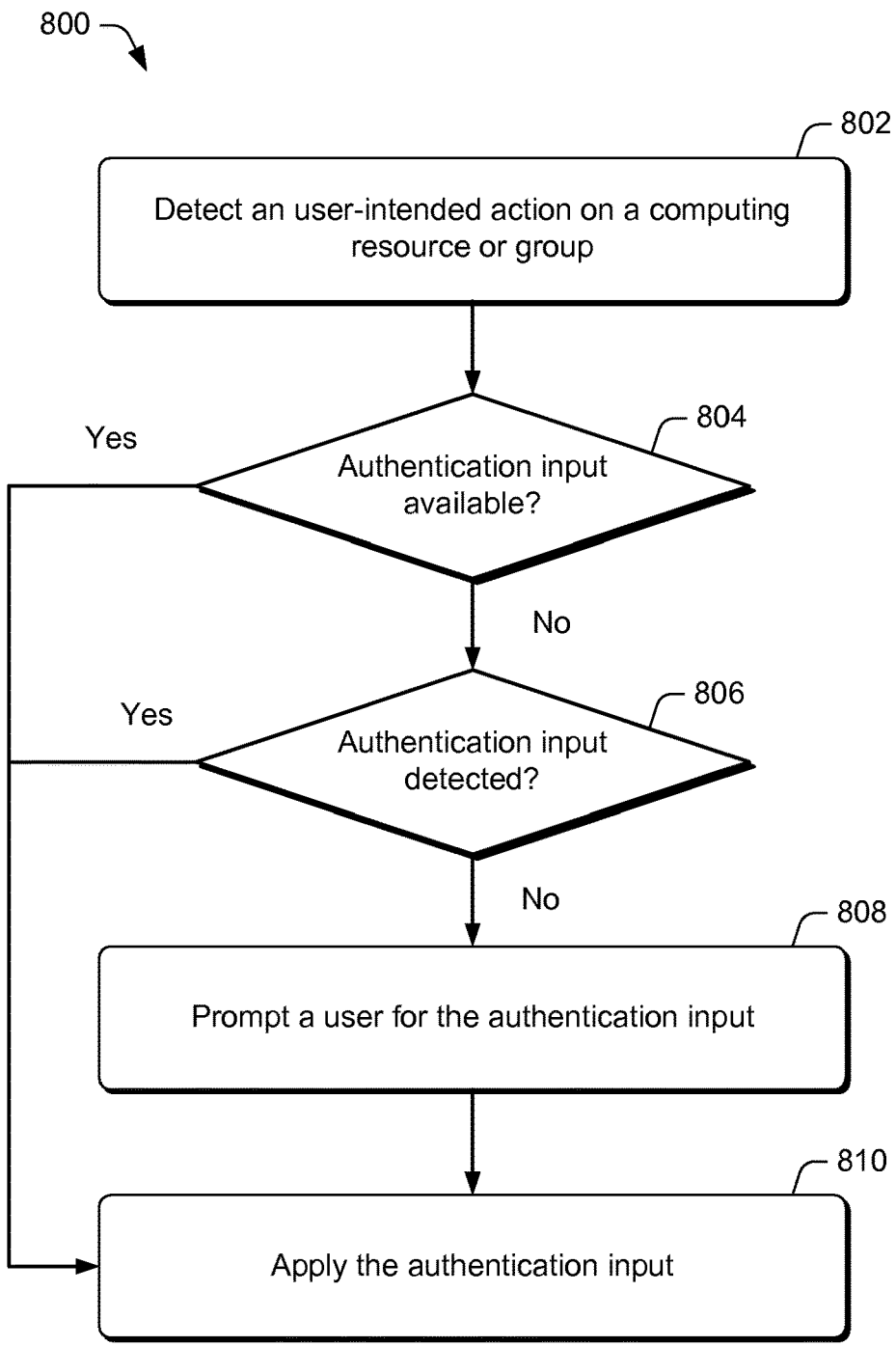
FIG. 8 is a flow diagram illustrating an exemplary process for receiving authentication input on a computing device, as implemented on the exemplary scheme show in FIG. 1, in accordance with at least one embodiment.

FIG. 8 is a flow diagram illustrating an exemplary process 800 for receiving authentication input on a computing device in accordance with at least one embodiment. FIG. 8 may further illustrates block 606 of the process 600 and/or block 706 of the process 800. At block 802, the computing device may detect a user-intended action on a computing resource or a group of computing resources. For example, the computing device may detect that the user is attempting to delete a photo by selecting a "delete" command on a user interface. At decision block 804, the computing device may determine whether an authentication input need for performing the intended action is available. In various embodiments, the needed authentication input may be available if it was previously submitted by the user. For example, the authentication input may be a previously submitted password that is stored in a database, such as the database 418 (FIG. 4) of the exemplary network server 124 (FIG. 1). In another example, the authentication input may be stored in a database on a local device, such as a networked device 122 (FIG. 1), in a similar manner.

If the computing device determines that the needed authentication input is available ("yes" at decision block 804), the process 800 may continue to block 810. At block 810, the authentication input may be applied by the computing device as the authentication input for the user-intended action detected at block 802. The applied authentication input may then be used to determine whether the user is granted permission to perform the intended action, as described above in processes 600 and/or 700. However, if the computing device determines that the needed authentication input is not available ("no" at decision block 804), the process 800 may continue to decision block 806.

At decision block 806, the computing device may automatically determine whether the authentication input in the form of an authenticator is present proximate the computing device. For example, the computing device may determine whether a needed authenticator (e.g., hardware certificate and a private key, a software certificate stored on a device, etc.) is accessible via a communication connection (e.g., Bluetooth, Wi-Fi, etc.)

If the computing device determines that the authentication input is detected ("yes" at decision block 806), the process 800 may continue to block 810. At block 810, the authentication input may be applied by the computing device as the authentication input for the user-intended action detected at block 802. The applied authentication input may then be used to determine whether the user is granted permission to perform the intended action, as described above in processes 600 and/or 700. However, if the computing device determines that the authentication input is not detected ("no" at decision block 806), the process 800 may proceed to block 808.

At block 808, the computing device may prompt the user for authentication input (e.g., identity, password, biometric data). Once the authentication is received, the process 800 may proceed to block 810. At block 810, the authentication input may be applied by the computing device as the authentication input for the user-intended action detected at block 802. The applied authentication input may then be used to determine whether the user is granted permission to perform the intended action, as described above in processes 600 and/or 700. It will be appreciated that in additional embodiments of the process 800, a combination of automatic detection and user prompt to obtain authentication input, such as described in blocks 804, 806, and 808, may be implemented.

Exemplary Computing Environment

Figure 9:
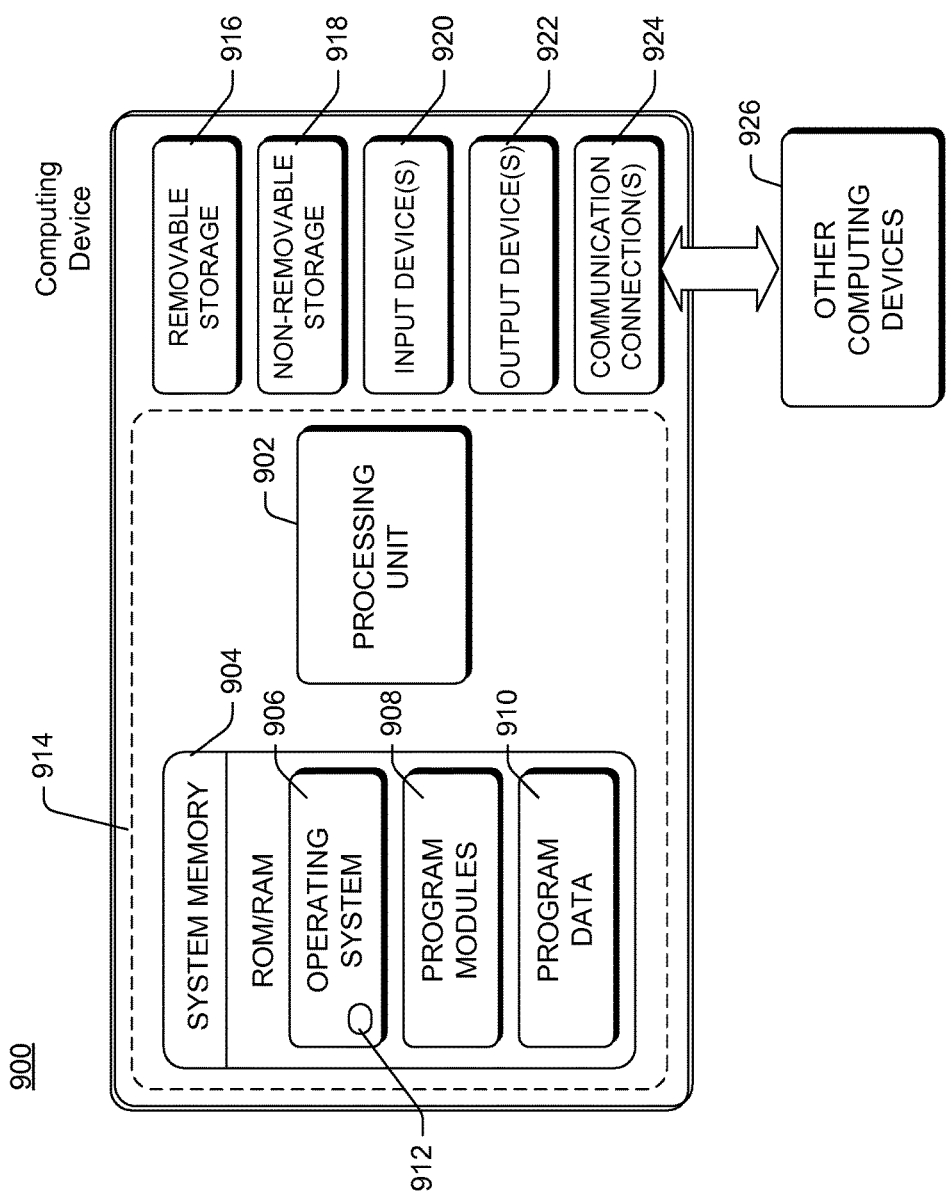
FIG. 9 is a block diagram illustrating a representative computing device. The representative device may be a part of the exemplary scheme show in FIG. 1.

FIG. 9 illustrates a representative computing device 900 that may be used to implement the selective networked resource access techniques and mechanisms described herein. For example, the authentication server 104 (FIG. 1) may be implemented on the representative computing device 900. However, it will be readily appreciated that the various embodiments of the selective networked resource techniques and mechanisms may be implemented in other computing devices, systems, and environments. The computing device 900 shown in FIG. 9 is only one example of a computing device and is not intended to suggest any limitation as to the scope of use or functionality of the computer and network architectures. Neither should the computing device 900 be interpreted as having any dependency or requirement relating to any one or combination of components illustrated in the example computing device.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 906, one or more program modules 908, and may include program data 910. The operating system 906 includes a component-based framework 912 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 900 is of a very basic configuration demarcated by a dashed line 914. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and nonvolatile, removable and non-removable media implemented in any method or technology for storage of information, such as computer readable instructions, data structures, program modules, or other data. System memory 904, removable storage 916 and non-removable storage 918 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 920 such as keyboard, mouse, pen, voice input device, touch input device, etc. Output device(s) 922 such as a display, speakers, printer, etc. may also be included. These devices are well known in the art and are not discussed at length here.

Computing device 900 may also contain communication connections 924 that allow the device to communicate with other computing devices 926, such as over a network. These networks may include wired networks as well as wireless networks. Communication connections 924 are examples of communication media. Communication media may typically be embodied by computer readable instructions, data structures, program modules, etc.

It is appreciated that the illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The provision of differentiated access to networked resources based the attributes of the authentication inputs may enhance security. This enhanced security may be especially important for the protection of high end, valuable, expensive or sensitive resources, applications or data. Thus, embodiments in accordance with this disclosure may serve to ensure that only the intended authorized and properly authenticated entities access these resources.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-implemented method for accessing groups of computing resources, comprising:
   under control of one or more computing systems comprising memory and one or more processors;
   organizing one or more computing resources accessible in a desktop environment into a group, the one or more computing resources including at least one of a data content, an application, a network portal, or a device, the organizing based at least in part on:
      a usage pattern associated with user interaction with the one or more computing resources in the group;
      a reliability of the one or more computing resources; and
      performance demands of the one or more computing resources; and
   providing an authentication policy to associate one or more authentication inputs with individual actions of a plurality of actions directed to individual computing resources of the one or more computing resources within the group, wherein the plurality of actions include one or more types of individual actions and individual authentication inputs of the one or more authentication inputs are based at least in part on the one or more types of individual actions;
   determining that a user initiates a type of individual action of the one or more types of the individual actions directed to an individual computing resource of the individual computing resources within the group;
   receiving an authentication input of the one or more authentication inputs based at least in part on determining that the user initiates the type of individual action directed to the individual computing resource;
   determining that the authentication input is verified; and
   allowing the type of individual action initiated by the user to be performed by the individual computing resource.

2. The method of claim 1, further comprising adding an additional computing resource accessible to the user into the group that includes one or more of a data content, a network portal, an application, or a device, the additional computing resource meeting predetermined criteria, the predetermined criteria being determined in part on at least one of usage patterns, security requirements, or reliability of the additional computing resource.

3. The method of claim 1, wherein the authentication input is provided via one of the device or the network portal.

4. The method of claim 1, wherein receiving the authentication input includes prompting the user for the authentication input.

5. The method of claim 1, wherein the authentication input includes at least one of an identity, a password, a hardware identity certificate, or a software identity certificate.

6. The method of claim 1, wherein:
   the individual authentication inputs include a type attribute and a strength attribute;
   the type attribute is configured to identify the authentication input as including at least one of an identity, a password, a hardware-based input, or a software-based input; and
   the strength attribute is configured to identify one of a permutational complexity of a password or a cryptographic complexity of an identity certificate.

7. The method of claim 1, wherein:
   the plurality of actions includes at least one of accessing the one or more computing resources, modifying the one or more computing resources, or removing the one or more computing resources; and the one or more types of individual actions include at least one of reader type actions that include at least accessing the one or more computing resources, contributor type actions that include at least modifying the one or more computing resources, and administrator type actions that include at least removing the one or more computing resources.

8. The method of claim 1, wherein the one or more computing resources further include a local computing resource and a networked remote computing resource, and the group includes one of a local group and a networked remote group.

9. A computer storage device storing computer-executable instructions that, when executed, cause one or more processors to perform acts comprising:
organizing one or more first computing resources accessible in a desktop environment into a first group, the one or more first computing resources including at least one of a data content, an application, a network portal, or a device, wherein the organizing is based at least in part on:
a usage pattern associated with user interaction with the one or more first computing resources in the first group;
a reliability of the one or more first computing resources; and
performance demands of the one or more first computing resources;
providing an authentication policy that associates one or more authentication inputs with individual actions of a plurality of actions directed to the first group, the authentication policy associating:
a first authentication input of the one or more authentication inputs with a first individual action of the individual actions; and
a second authentication input of the one or more authentication inputs with a second individual action of the individual actions, wherein the first individual action is a different type of action than the second individual action and the first authentication input is different from the second authentication input based at least in part on the first individual action being the different type of action than the second individual action;
receiving an authentication input of the one or more authentication inputs when a user directs one of the first individual action or the second individual action to the first group, the authentication input received on a first device; and
allowing the user to perform the first individual action in response to determining that the authentication input is the first authentication input and allowing the user to perform the second individual action in response to determining that the authentication input is the second authentication input.

10. The computer storage device of claim 9, further comprising creating the first group prior to organizing the one or more first computing resources accessible in the desktop environment into the first group.

11. The computer storage device of claim 9, wherein the computer-executable instructions cause the one or more processors to perform further acts comprising creating a second group that includes one or more second computing resources, the one or more second computing resources including a data content, an application, a network portal, or a device.

12. The computer storage device of claim 9, wherein:
the authentication policy further associates a third authentication input of the one or more authentication inputs with a third individual action of the individual actions on one computing resource, wherein the third individual action is a different type of action than the first individual action and the second individual action and the third authentication input is different from the first authentication input and the second authentication input based at least in part on the third individual action being the different type of action than the first individual action and the second individual action, and
the computer-executable instructions cause the one or more processors to perform further acts comprising:
receiving a different authentication input of the one or more authentication inputs when the user directs the third individual action to the computing resource; and
allowing the user to perform the third individual action directed by the user to the computing resource when the authentication input is the third authentication input.

13. The computer storage device of claim 9, wherein the first individual action and the second individual action include at least one of accessing the first group, modifying the first group, and deleting the first group, and wherein the user directs at least one of the first individual action or the second individual action by selecting the first individual action or the second individual action from a display that presents one or more action options for the first group.

14. The computer storage device of claim 9, wherein the receiving at least one of the first authentication input or the second authentication input includes prompting the user for the authentication input.

15. The computer storage device of claim 9, wherein the authentication input includes at least one of an identity, a password, a hardware identity certificate, or a software identity certificate.

16. The computer storage device of claim 9, wherein:
the one or more authentication inputs include type attributes and strength attributes;
the type attributes are configured to identify the one or more authentication inputs as including at least one of an identity, a password, a hardware-based input, or a software-based input; and
the strength attributes are configured to identify one of a permutational complexity of a password or a cryptographic complexity of an identity certificate.

17. A system for accessing groups of computing resources, comprising:
memory;
one or more processors; and
programming instructions stored on the memory that, based on execution by the one or more processors, configure the one or more processors to:
organize one or more computing resources accessible in a desktop environment into a group, the one or more computing resources include at least one of a data content, an application, a network portal, or a device, the organizing based at least in part on:
a usage pattern associated with user interaction with the one or more computing resources in the group;
a reliability of the one or more computing resources; and
performance demands of the one or more computing resources;
provide an authentication policy that respectively associates one or more authentication inputs with a plurality of actions for the group, individual authentication inputs of the one or more authentication inputs being different from other authentication inputs of the one or more authentication inputs based at least in part on a type of individual action of the plurality of actions associated with the individual authentication inputs;

determine that a user directs an action of the plurality of actions to the group;

based at least in part on determining that the user directs the action, receive an authentication input of the one or more authentication inputs corresponding to the action; verify the authentication input; and allow the action directed by the user to be performed by the group.

18. The system of claim 17, wherein the one or more modules are further executed by the one or more processors to add an additional computing resource accessible to the user into the group, the additional computing resource including one of a data content, an application, or a device.

19. The method of claim 1, wherein the authentication input is received from a first device, and the method further comprises:

synchronizing the first device with a second device such that the user is allowed to perform at last one of the plurality of actions using the second device without additional authentication input.

20. The computer storage device of claim 9, the acts further comprising:

synchronizing the first device with a second device such that the user is allowed to perform the first individual action and the second individual action using the second device without additional authentication input.

* * * * *